United States Patent
Chun et al.

(10) Patent No.: US 8,289,911 B2
(45) Date of Patent: Oct. 16, 2012

(54) METHOD OF SCHEDULING OF TRANSMITTING DATA IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/450,268

(22) PCT Filed: Mar. 21, 2008

(86) PCT No.: PCT/KR2008/001611
§ 371 (c)(1),
(2), (4) Date: Sep. 18, 2009

(87) PCT Pub. No.: WO2008/115029
PCT Pub. Date: Sep. 25, 2008

(65) Prior Publication Data
US 2010/0118798 A1  May 13, 2010

Related U.S. Application Data

(60) Provisional application No. 60/896,250, filed on Mar. 21, 2007.

(30) Foreign Application Priority Data

Mar. 21, 2008 (KR) .......................... 10-2008-0026344

(51) Int. Cl.
*H04W 4/00* (2009.01)
(52) U.S. Cl. ..................... 370/329; 370/395.4; 370/311; 370/412

(58) Field of Classification Search .................. 370/241, 370/310, 311, 314, 328, 329, 338, 341, 344, 370/345, 395.4, 395.41, 395.42, 412–416, 370/444, 537; 455/422.1, 434, 436–444, 455/450–454, 509–513, 550.1, 556.2
See application file for complete search history.

(56) References Cited

U.S. PATENT DOCUMENTS 7,872,986 B2   1/2011   Chun et al.
(Continued)

FOREIGN PATENT DOCUMENTS

EP   1509012   2/2005
(Continued)

OTHER PUBLICATIONS

"Uplink Resource Allocation Scheme" 3GPP TSG 3GPP-RAN WG2 #54, NTT DoCoMo, Aug. 26-Sep. 1, 2006.*
(Continued)

*Primary Examiner* — Habte Mered
(74) *Attorney, Agent, or Firm* — McKenna Long & Aldridge LLP

(57) ABSTRACT

A method for transmitting data in a wireless communication system is disclosed. The method for transmitting data from the user equipment (UE) of the wireless communication system to the network comprises, upon receiving uplink scheduling information from the network, periodically transmitting uplink data to the network according to a first period, and if a buffer status of the user equipment (UE) satisfies a predetermined condition, transmitting buffer status information to the network. The method further includes periodically transmitting uplink data to the network according to a second period different from the first period.

13 Claims, 10 Drawing Sheets

U.S. PATENT DOCUMENTS

| | | | |
|---|---|---|---|
| 7,912,471 | B2 | 3/2011 | Kodikara Patabandi et al. |
| 2003/0125037 | A1 | 7/2003 | Bae et al. |
| 2004/0014452 | A1 | 1/2004 | Lim et al. |
| 2004/0229659 | A1 | 11/2004 | Boos et al. |
| 2007/0064665 | A1 | 3/2007 | Zhang et al. |
| 2007/0109987 | A1 | 5/2007 | Kohlmann et al. |
| 2007/0183355 | A1 | 8/2007 | Kuchibhotla et al. |
| 2007/0206531 | A1 | 9/2007 | Pajukoski et al. |
| 2007/0230400 | A1 | 10/2007 | Kuchibhotla et al. |
| 2007/0286080 | A1 | 12/2007 | Kim et al. |
| 2007/0291719 | A1 | 12/2007 | Demirhan et al. |
| 2007/0291728 | A1 | 12/2007 | Dalsgaard et al. |
| 2008/0049669 | A1 | 2/2008 | Lundby et al. |
| 2008/0081628 | A1* | 4/2008 | Ye et al. ............ 455/445 |
| 2008/0101268 | A1 | 5/2008 | Sammour et al. |
| 2008/0108346 | A1 | 5/2008 | Umatt et al. |
| 2008/0117891 | A1 | 5/2008 | Damnjanovic et al. |
| 2008/0167089 | A1 | 7/2008 | Suzuki et al. |
| 2008/0186892 | A1 | 8/2008 | Damnjanovic |
| 2008/0214249 | A1 | 9/2008 | Kim et al. |
| 2008/0267118 | A1* | 10/2008 | Cai et al. ............ 370/329 |
| 2008/0273610 | A1 | 11/2008 | Malladi et al. |
| 2009/0252124 | A1* | 10/2009 | Yeo et al. ............ 370/336 |

FOREIGN PATENT DOCUMENTS

| | | |
|---|---|---|
| JP | 2005-525761 | 8/2005 |
| WO | WO 2006/019267 | 2/2006 |
| WO | WO 2007/013457 | 2/2007 |
| WO | WO 2007/025138 | 3/2007 |
| WO | WO 2007/073118 | 6/2007 |

OTHER PUBLICATIONS

"Periodic Scheduling of Uplink Resources for LTE VOIP", Intedigital, 3GPP '04.60 TSG 3GPP-RAN WG2 #56, Nov. 2006.*

NTT DoCoMo, Inc., "Uplink Resource Allocation Scheme", 3GPP TSG-RAN WG2, R2-062164, XP002460801, Aug. 28, 2006.

Interdigital Communications Corporation: "Periodic Scheduling of Uplink Resources for LTE VoIP", 3GPP TSG-RAN WG2, R2-063183, XP050132684, Nov. 6, 2006.

LG Electronics: "UL Scheduling for VoIP", 3GPP TSG-RAN WG2, R2-062927, XP050132445, Oct. 9, 2006.

Lucent Technologies: "Uplink Scheduling Requests for Real Time Services", 3GPP TSG-RAN WG2, R2-062227, XP002460798, Aug. 28, 2006.

Samsung, "DRX operations for connected mode UEs in LTE", R2-063120; 3GPP Draft; R2-063120, 3rd Generation Partnership Project (3GPP), vol. RAN WG2, XP050132629, Nov. 2006.

3rd Generation Partnership Project: "3rd Generation Partnership Project; Technical Specification Group Radio Access Network; Physical Channels and Modulation (Release 8)"; 3GPP TS 36.211 V1.0.0 (Mar. 2007); RP-070169 Mar. 8, 2007, pp. 1-30, XP002552926, retrieved on Oct. 29, 2009.

Ericsson: "Issues on DRX in LTE Active", R2-070797, 3GPP Draft; 3rd Generation Partnership Project (3GPP), vol. RAC WG2, XP050133822, Feb. 2007.

ETRI: "DRX control in LTE_Active", R2-070120, 3GPP Draft, 3rd Generation Partnership Project (3GPP), vol. RAN WG2, XP050133232, Jan. 2007.

NTT DoCoMo, Inc., "Views on DRX/DTX control in LTE", R2-063397, 3GPP Draft, 3rd Generation Partnership Project (3GPP), vol. RAN WG2 #56, XP007905621, Nov. 2006.

NTT DoCoMo et al: "LTE_Active DRX control", R2-070776, 3GPP Draft, 3rd Generation Partnership Project (3GPP), vol. RAN WG2, XP050133802, Feb. 2007.

LG Electronics: "DRX Scheme" R2-070265, 3GPP Draft, 3rd Generation Partnership Project (3GPP), vol. RAN WG2 #56bis, XP002450413, Jan. 2007.

Samsung: DRX operations for connected mode UEs in LTE, 3GPP TSG-RAN2 Meeting #56, Riga, Latvia, Nov. 6-10, 2006, R2-063120.

Motorola, Random Access Procedure and Message Contents, 3GPP TSG-RAN WG2 AH, Jun. 30, 2006, R2-061991.

LG Electronics, Initial access procedure, 3GPP TSG RAN WG2 # Ad hoc on LTE, Jun. 27, 2006, R2-061986.

* cited by examiner

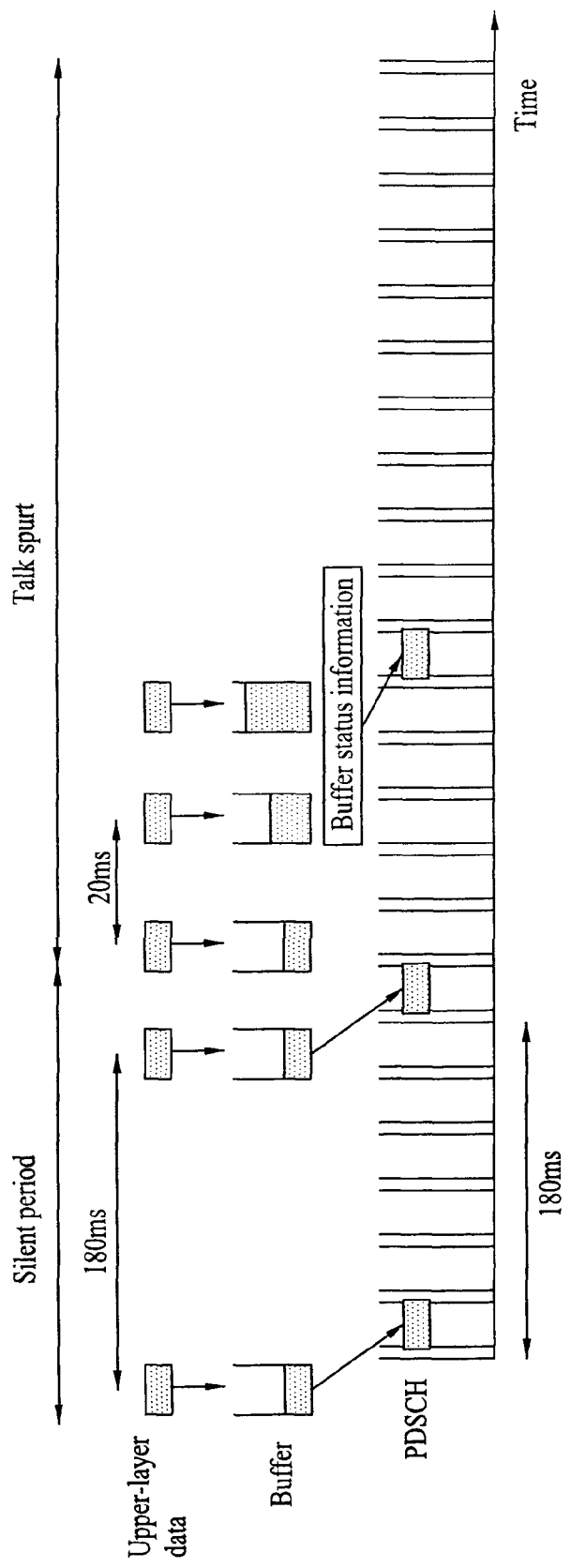

METHOD OF SCHEDULING OF TRANSMITTING DATA IN A WIRELESS COMMUNICATION SYSTEM

This application is a 371 national stage entry of International Application No. PCT/KR2008/001611, filed Mar. 21, 2008, and claims priority to U.S. Provisional Patent Application No. 60/896,250, filed Mar. 21, 2007, and Korean Patent Application No. 10-2008-0026344,filed in the Republic of Korea on Mar. 21, 2008, the contents of each of the above-identified applications is incorporated by reference herein in their entireties.

TECHNICAL FIELD

The present invention relates to a wireless communication system, and more particularly to a method for transmitting data in a wireless communication system.

BACKGROUND ART

In a wireless communication system (e.g., an Orthogonal Frequency Division Multiple Access (OFDMA) system or a Single Carrier-Frequency Division Multiple Access (SC-FDMA) system), radio resources are considered to be the set of consecutive sub-carriers, and are defined by a two-dimensional (2D) time-frequency region (also called a 2D time-frequency domain).

A single time-frequency region is denoted by a rectangle decided by time coordinates and sub-carrier coordinates. In other words, a single time-frequency region can be denoted by a rectangle defined by both a symbol of at least one time axis and a sub-carrier of several frequency axes. The time-frequency region may be allocated to an uplink of a specific user equipment (UE). In a downlink, a base station (BS) (also called a Node-B) may transmit the time-frequency region to a specific UE.

In order to define the above-mentioned time-frequency domain in a two-dimensional (2D) space, a predetermined number of OFDM symbols must be provided to the time domain, and a predetermined number of consecutive sub-carriers must be provided to the frequency domain such that the consecutive sub-carriers will begin at a predetermined position which is spaced apart from a reference point of the frequency domain by a predetermined offset.

In an Evolved Universal Mobile Telecommunications System (E-UMTS) system, radio frames of 10 ms have been used, and a single radio frame includes 20 sub-frames. In other words, the single radio frame corresponds to 0.5 ms. A single resource block includes a single sub-frame and 12 sub-carriers. Each of the 12 sub-carriers includes a band of 15 kHz. A single sub-frame includes several OFDM symbols. Some parts (e.g., a first symbol) of the several OFDM symbols may be used to transmit L1/L2 control information.

FIG. 1 is a conceptual diagram illustrating a physical channel structure for use in the E-UMTS system. A single sub-frame includes a hatched part serving as an L1/L2 control information transmission part and a non-hatched part serving as a data transmission area.

FIG. 2 is a conceptual diagram illustrating a general method for transmitting data in the E-UMTS system. Generally, the E-UMTS system uses a Hybrid Auto Repeat request (HARQ) technique serving as a data retransmission technique, so that it improves a throughput and performs seamless communication.

Referring to FIG. 2, a base station (BS) transmits downlink scheduling information (also called "DL scheduling information) over a DL L1/L2 control channel (e.g., a physical downlink control channel (PDCCH)), so that it transmits data to the user equipment (UE) according to the HARQ technique. The DL scheduling information may include a UE identifier (ID) or a group ID, resource assignment information allocated to transmit downlink data or duration of assignment information, transmission parameters (e.g., a modulation scheme, a payload size, and MIMO-associated information), HARQ process information, redundancy version information, and a new data indicator.

During the above-mentioned process, a UE ID (or a group ID) such as a radio network temporary identifier (RNTI) is transmitted, such that the UE ID (or group ID) can indicate which one of UEs is used for DL scheduling information transmitted over the PDCCH. The radio network temporary identifier (RNTI) is classified into a dedicated RNTI and a common RNTI. The dedicated RNTI is used to transmit/receive data to/from a UE registered in a Node-B. Provided that no information is registered in a Node-B and the Node-B communicates with UEs having no dedicated RNTIs, the common RNTI is used to transmit or receive common information (or system information) of several UEs. There are a variety of common RNTIs, for example, a RA-RNTI or T-C-RNTI for use in a random-access process over a Random Access Channel (RACH). The UE ID or the group ID may be CRC-masked on the DL scheduling information transferred over the PDCCH.

UEs contained in a specific cell monitor the PDCCH over the L1/L2 control channel using UEs' RNTI information. If the UEs successfully perform the CRC decoding using their RNTI information, they receive the DL scheduling information over a corresponding PDCCH. The above-mentioned UE receives downlink data to be transmitted to the UE itself, over a PDSCH indicated by the received DL scheduling information.

The scheduling schemes can be classified into a dynamic scheduling scheme and a persistent scheduling scheme. The dynamic scheduling scheme transmits the scheduling information to a specific UE over a DPCCH, whenever uplink or downlink resources must be allocated to the specific UE. The persistent scheduling scheme indicates that the Node-B statically allocates downlink or uplink scheduling information to the UE at an initial call setup such as a radio bearer setup.

According to the persistent scheduling scheme, the UE does not receive DL- or UL-scheduling information from the Node-B whenever it transmits or receives data, and uses the scheduling information pre-allocated to the Node-B. For example, provided that the Node-B transmits an RRC signal to a specific UE at the radio bearer setup process, the specific UE will receive downlink data from the Node-B via "A" radio resources according to a "B" transmission scheme during a "C" period by the RRC signal. As a result, the specific UE can receive downlink data from the Node-B using the above "A", "B", and "C" information. In this way, although data is transmitted from the UE to the Node-B, the UE can transmit downlink data using predetermined radio resources according to the pre-allocated uplink scheduling information. The above-mentioned persistent scheduling scheme is optimized for a service (e.g., a voice communication service) having regular traffic characteristics.

Voice data formed by an AMR codec (i.e., an audio codec) used for the voice communication service has specialized characteristics. Namely, voice data is divided into a talk spurt and a silent period. The talk spurt is indicative of a period of voice data formed while a user really talks to someone. The silent period is indicative of a period of voice data formed while a user does not talk to someone. For example, a voice packet including voice data in the talk spurt is generated at intervals of 20 ms, and a silence insertion descriptor (SID) packet including voice data in the silent period is generated at intervals of 160 ms.

In the case of applying the persistent scheduling scheme to the voice communication, the Node-B may establish radio resources according to the talk spurt. In more detail, the Node-B may use characteristics indicating that a voice packet is generated at intervals of a predetermined time of 20 ms, and may pre-establish radio resources for transmitting/receiving uplink- or downlink-data at intervals of a predetermined time of 20 ms during the call setup process. In this case, if a current status is changed from the talk spurt to the silent period, the SID packet is generated at intervals of a predetermined time of 160 ms, such that considerable amounts of radio resources, which have been allocated at intervals of 20 ms, are unavoidably consumed.

In this way, it is assumed that the Node-B pre-allocates radio resources to the UE in response to the silent period according to the persistent scheduling scheme such that the UE can use the radio resources at intervals of 160 ms in response to the silent period according to the persistent scheduling scheme. Under this situation, if the UE moves from the silent period to the talk spurt, there is a small amount of allocated resources whereas there are large amounts of voice information to be transmitted by the UE, resulting in the occurrence of a delay of voice information transmission.

DISCLOSURE OF THE INVENTION

As described above, a method for controlling a Node-B to quickly change the pre-allocated radio-resource allocation information when a talk spurt is changed to a silent period or the silent period is changed to the talk spurt during a scheduling time in which the uplink or downlink resources for voice communication are scheduled according to a persistent scheduling scheme, so that radio resources suitable for the changed period characteristics can be re-allocated is needed. The necessity can also be raised in not only the voice communication but also other communication schemes having the necessity for interchanging between at least two modes.

Accordingly, the present invention is directed to a method for transmitting data in a wireless communication system that substantially obviates one or more problems due to limitations and disadvantages of the related art. An object of the present invention is to provide a data transmission method for allowing a wireless communication system to effectively use radio resources.

To achieve these objects and other advantages and in accordance with the purpose of the invention, as embodied and broadly described herein, a method for transmitting data from a user equipment (UE) of a wireless communication system to a network comprising, upon receiving uplink scheduling information from the network, periodically transmitting uplink data to the network according to a first period, and if a buffer status of the user equipment (UE) satisfies a predetermined condition, transmitting buffer status information to the network. The UE transmits periodically uplink data to the network according to a second period different from the first period.

A method for transmitting data from a user equipment (UE) of a wireless communication system to a network comprising, upon receiving uplink scheduling information from the network, transmitting uplink data to the network according to a first mode, transmitting buffer status information to the network, if a buffer status of the user equipment (UE) satisfies a predetermined condition, and transmitting uplink data to the network according to a second mode.

DESCRIPTION OF THE DRAWINGS

FIG. 5 shows a radio interface protocol structure between the UE and the E-UTRAN system according to the present invention.

FIGS. 8A and 8B are conceptual diagrams illustrating a method for allowing a UE to transmit buffer status information from a silent period to a Node-B according to the present invention.

BEST MODE FOR CARRYING OUT THE INVENTION

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
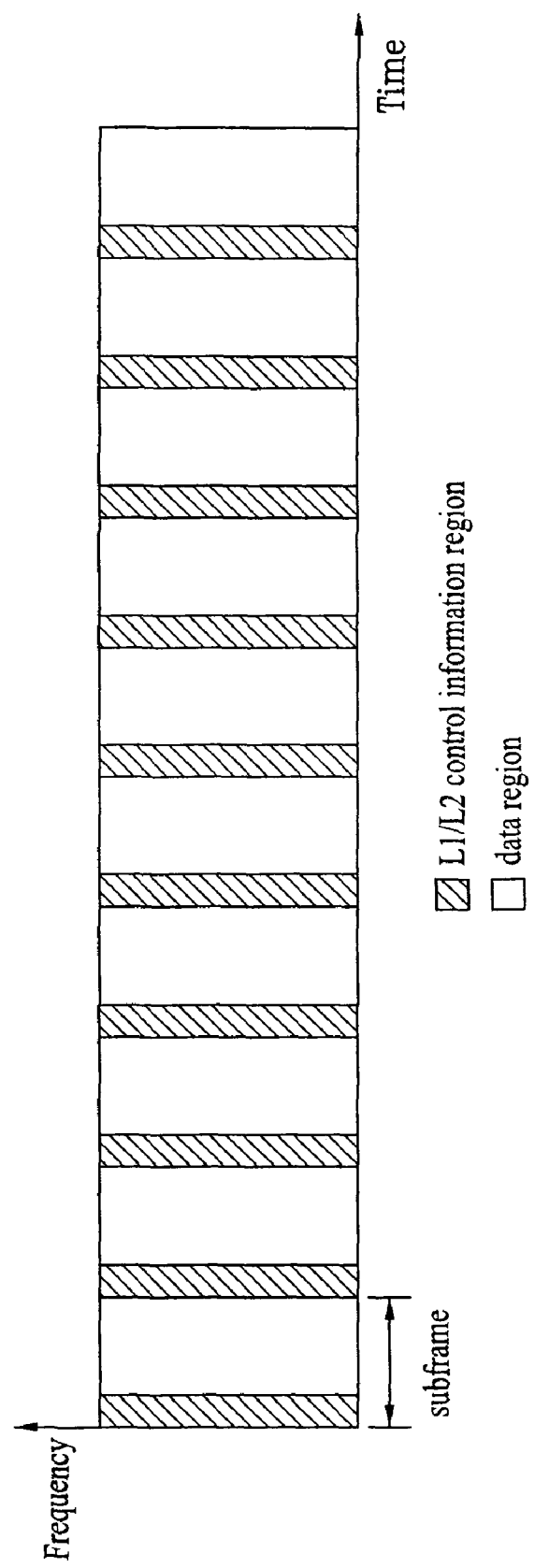
FIG. 1 is a conceptual diagram illustrating a physical channel structure for use in an E-UMTS system.
Figure 2:
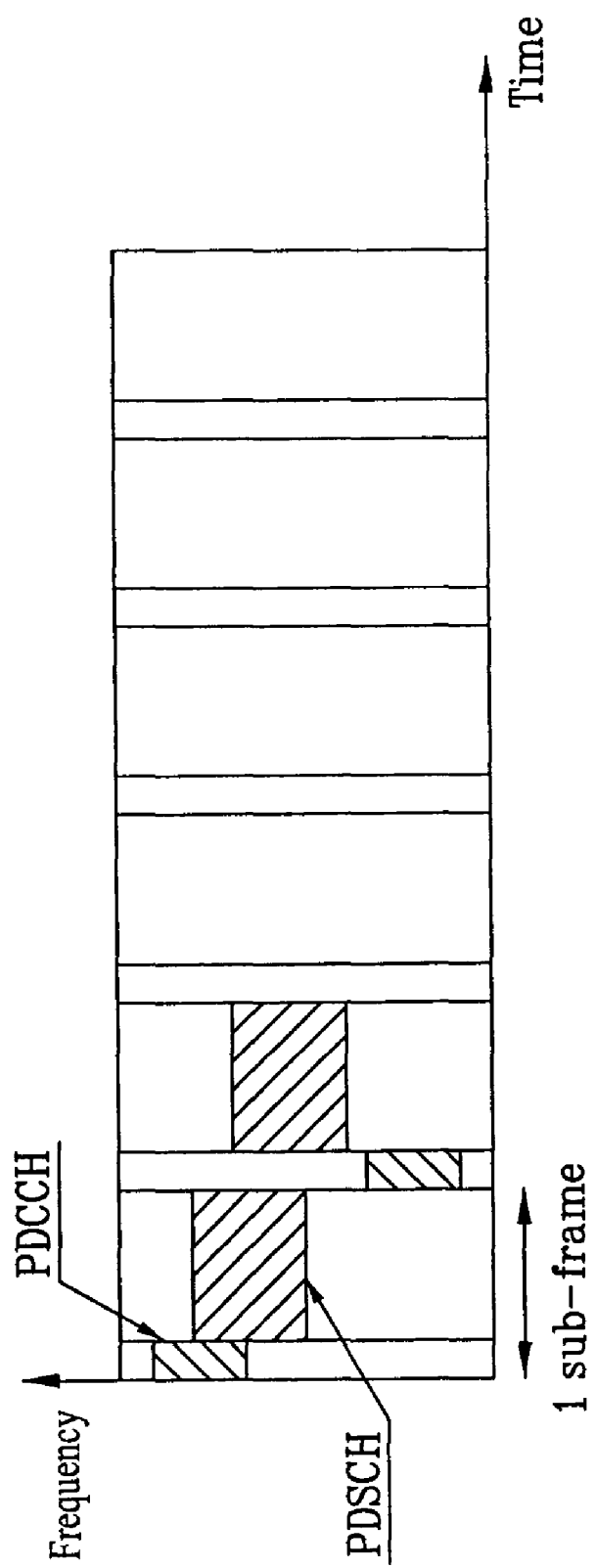
FIG. 2 is a conceptual diagram illustrating a general method for transmitting data in an E-UMTS system.
Figure 3:
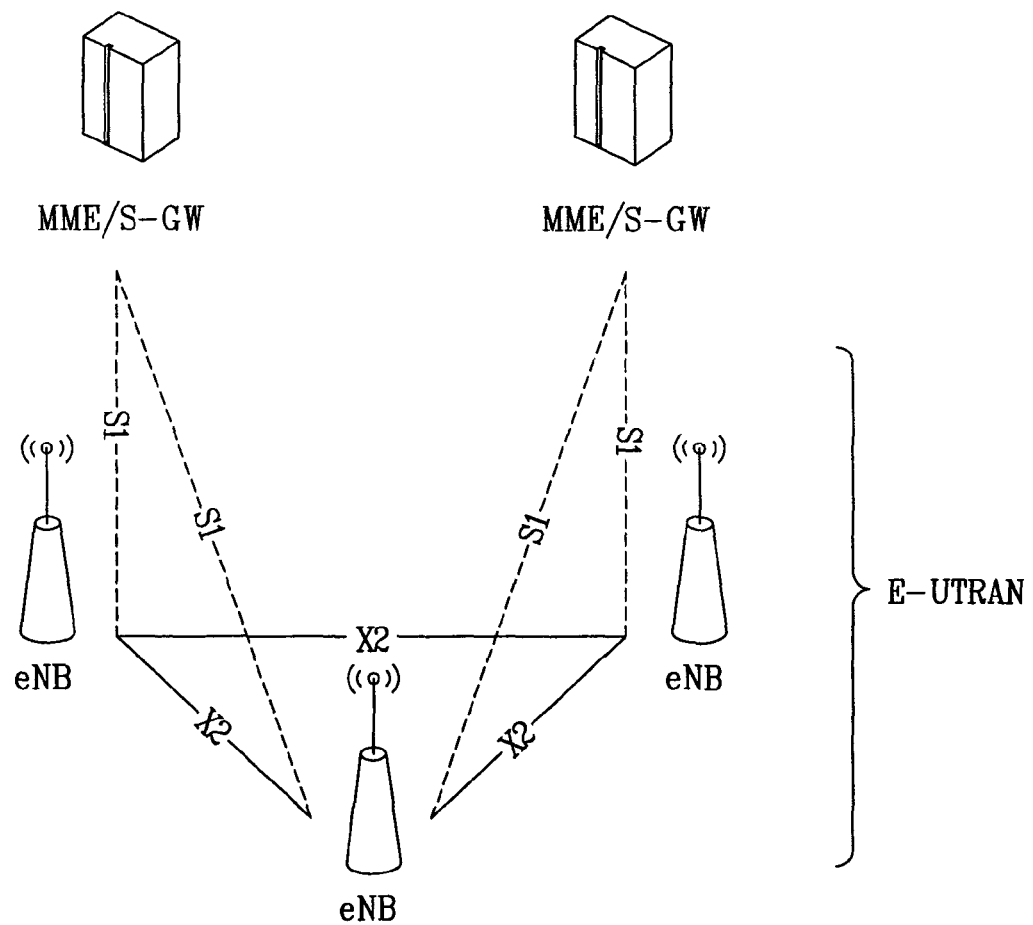
FIG. 3 is a conceptual diagram illustrating an E-UMTS network structure according to the present invention.

FIG. 3 shows a network structure of the E-UMTS. The E-UMTS system is an evolved version of the conventional WCDMA UMTS and basic standardization thereof is in progress under the 3rd Generation Partnership Project (3GPP). The E-UMTS is also referred to as a Long Term Evolution (LTE) system. See "http://www.3gpp.org/ftp/Specs/2006-12/" and "http://www.3gpp.org/ftp/Specs/html-info/GanttChart-Level-2.htm" for details of the technical specifications of the UMTS and E-UMTS.

Referring to FIG. 3, an E-UTRAN includes base stations which will be referred to as "eNode B" or "eNB" for short. The eNBs are connected through X2 interfaces. Each eNB is connected to User Equipments (UEs) (or terminals) through a radio interface and is connected to an Evolved Packet Core (EPC) through an S1 interface. The EPC includes a Mobility Management Entity (MME)/System Architecture Evolution (SAE) gateway.

Figure 4:
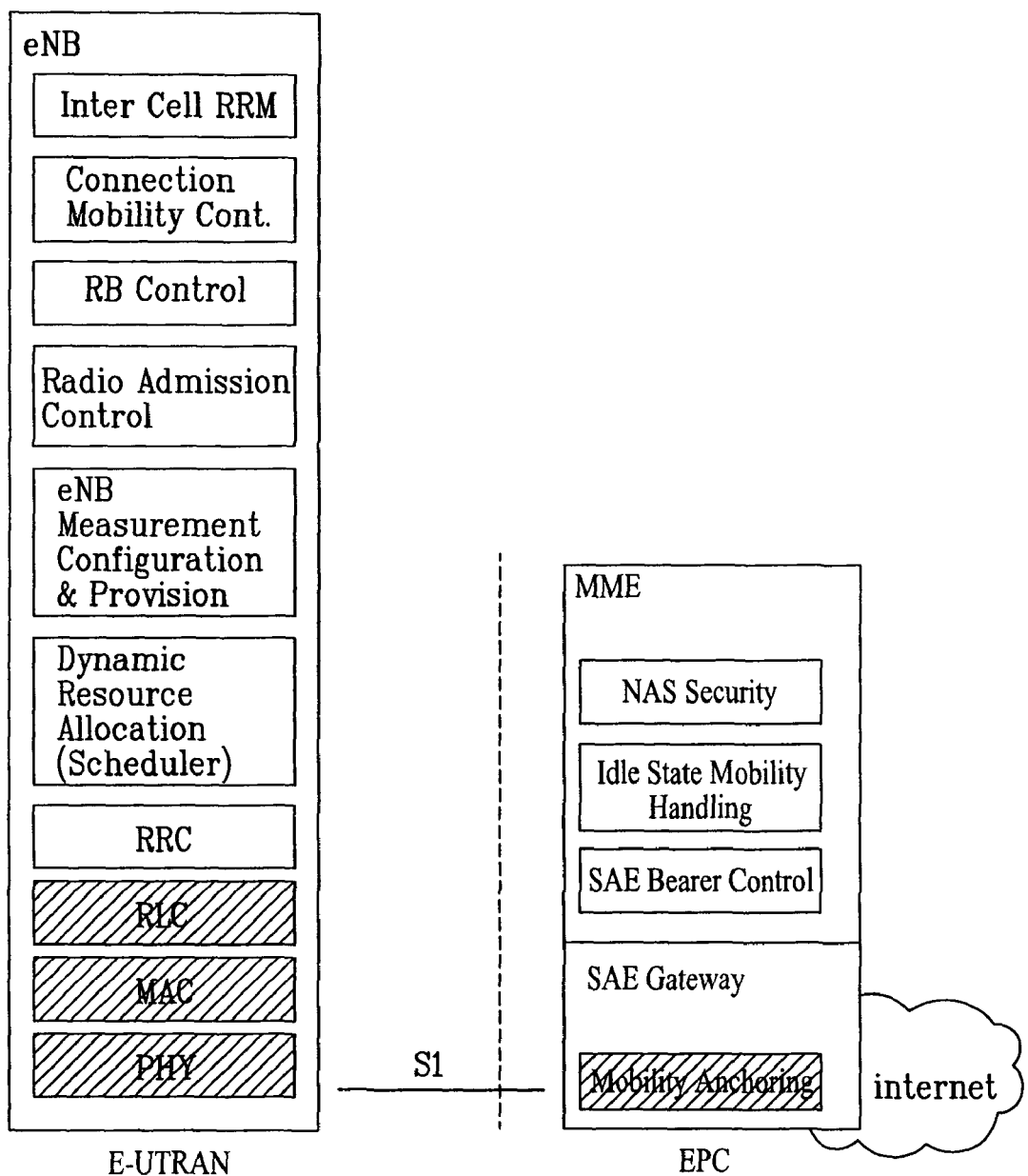
FIG. 4 is a conceptual diagram illustrating an Evolved Universal Terrestrial Radio Access Network (E-UTRAN) according to the present invention.

Radio interface protocol layers between UEs and the network can be divided into an L1 layer (first layer), an L2 layer (second layer), and an L3 layer (third layer) based on the lower three layers of the Open System Interconnection (OSI) reference model widely known in communication systems. A physical layer included in the first layer among these layers provides an information transfer service using a physical channel and a Radio Resource Control (RRC) layer located in the third layer controls radio resources between UEs and the network. To accomplish this, the RRC layer exchanges RRC messages between UEs and the network. The RRC layer may be provided in a distributed manner over network nodes such as Node Bs and AGs and may also be individually provided in a Node B or an AG FIG. 4 schematically illustrates an Evolved Universal Terrestrial Radio Access Network (E-UTRAN). In FIG. 4, hatched portions denote functional entities of the user plane and unhatched portions denote functional entities of the control plane.

Figure 5A:
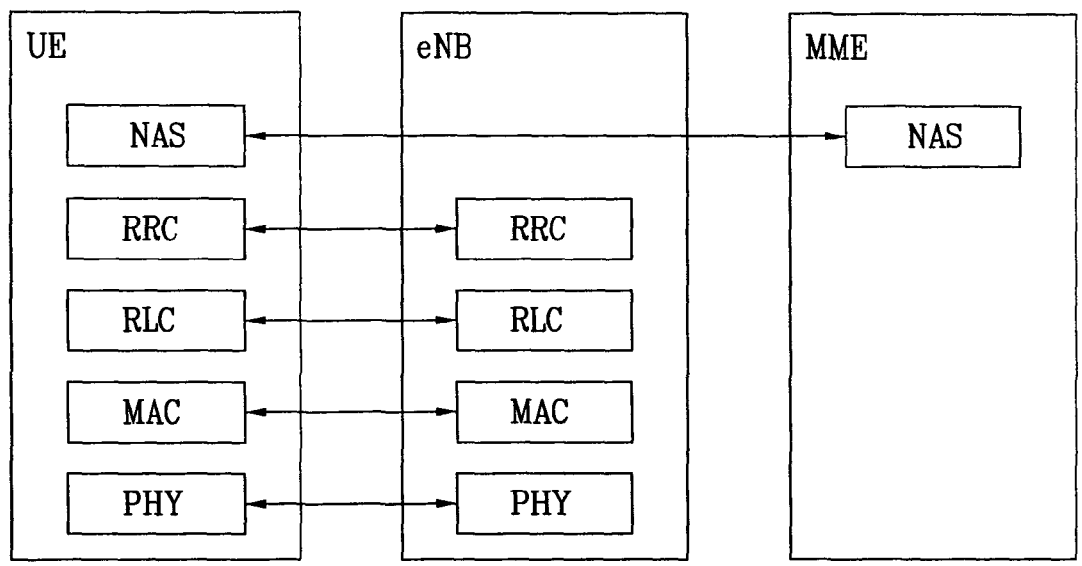
FIG. 5A shows a control plane protocol structure.
Figure 5B:
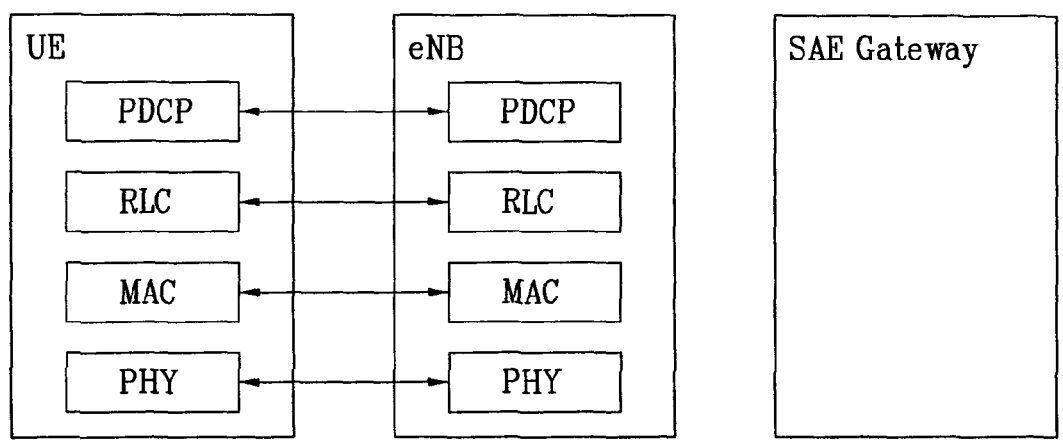
FIG. 5B shows a user plane protocol structure.

FIGS. 5A and 5B illustrate control-plane and user-plane radio interface protocol structures between a UE and an E-UTRAN, respectively. The radio interface protocol of FIGS. 5A and 5B is divided horizontally into a physical layer, a data link layer, and a network layer and vertically into a user plane for data information transmission and a control plane for signaling. The protocol layers of FIGS. 5A and 5B can be divided into an L1 layer (first layer), an L2 layer (second layer), and an L3 layer (third layer) based on the lower three layers of the Open System Interconnection (OSI) reference model widely known in communication systems.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. In the E-UMTS, the physical channel is modulated according to the Orthogonal Frequency Division Multiplexing (OFDM) method, using time and frequencies as radio resources.

The MAC layer, which is the second layer, provides a service to a Radio Link Control (RLC) layer, located above the MAC layer, through a logical channel. The RLC layer of the second layer supports reliable data transfer. A PDCP layer of the second layer performs a header compression function to reduce unnecessary control information in order to efficiently transmit data through IP packets such as IPv4 or IPv6 packets in a radio interval with a relatively small bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the UTRAN.

Downlink transport channels used to transmit data from the network to the UE include a Broadcast Channel (BCH) used to transmit system information, a Paging Channel (PCH) used to transmit paging messages, and a downlink Shared Channel (SCH) used to transmit user traffic or control messages. Control messages or traffic of a downlink multicast or broadcast service may be transmitted through a downlink SCH and may also be transmitted through a downlink multicast channel (MCH). Uplink transport channels used to transmit data from the UE to the network include a Random Access Channel (RACH) used to transmit initial control messages and an uplink SCH used to transmit user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

In the E-UMTS system, Orthogonal Frequency Division Multiplexing (OFDM) is used in downlink and Single Carrier-Frequency Division Multiple Access (SC-FDMA) is used in uplink. The OFDM system, which is based on a multicarrier scheme, allocates resources in units of groups of subcarriers, which are part of a carrier, and uses Orthogonal Frequency Division Multiple Access (OFDMA) as an access method.

Figure 6:
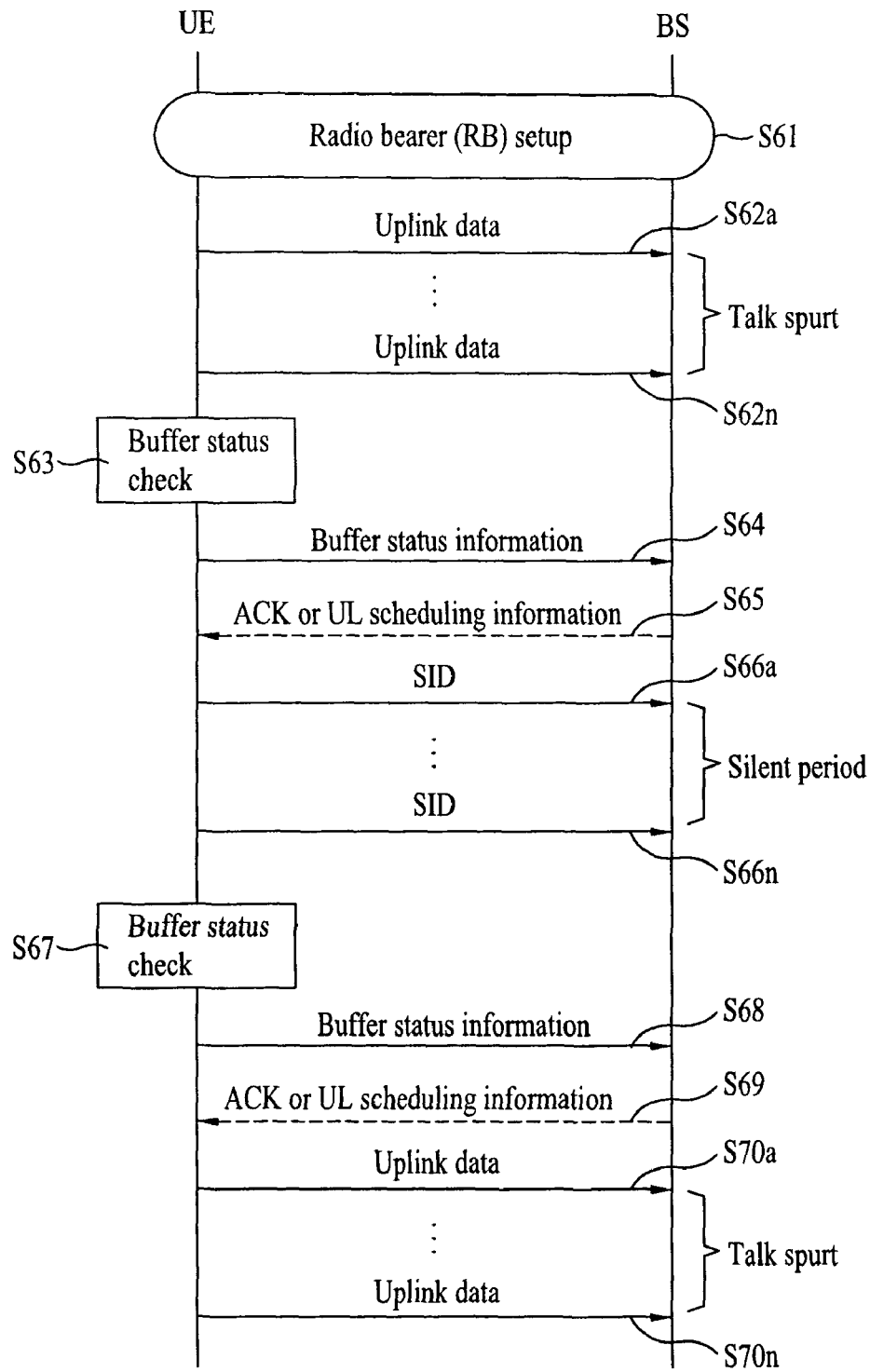
FIG. 6 is a flow chart illustrating a data transmission method according to the present invention.

FIG. 6 is a flow chart illustrating a data transmission method according to an embodiment of the present invention. In the case of a voice communication mode, the embodiment of FIG. 6 is applied to an uplink transmission path from the UE to the Node-B. The embodiment of FIG. 6 is based on the E-UMTS system, so that it may use the remaining technical items other than the following items by referring to the technical standard of the E-UMTS system.

Referring to FIG. 6, the UE enters a network and establishes a radio bearer (RB) with a base station (BS) [S61]. In order to apply the persistent scheduling scheme to the RB setup process, the base station (BS) transmits UL scheduling information and DL scheduling information to the UE. The UE transmits data formed by the voice communication to the Node-B using the UL scheduling information, and receives downlink data from the base station (BS) using the DL scheduling information.

The UL or DL scheduling information may further include general scheduling information, data transmission and reception (Tx/Rx) periods of the talk spurt, and data Tx/Rx periods of the silent period. In the embodiment of FIG. 6, it is assumed that the data Tx/Rx period for use in the talk spurt is 20 ms and the other data Tx/Rx period for use in the silent period is 180 ms. For another example, the UL scheduling information and the DL scheduling information may further include scheduling information of the talk spurt and other scheduling information of the silent period. In this case, the scheduling information applied to each period includes the data Tx/Rx period of a corresponding period. In the meantime, it is obvious to those skilled in the art that the UL and DL scheduling information can be transmitted from the base station (BS) to the UE, differently from the radio bearer (RB) setup process.

As described above, the UE receives the UL scheduling information from the base station (BS) during the talk spurt, and periodically transmits uplink data formed by a voice communication process to the base station (BS) at intervals of a data transmission (Tx) period (20 ms) [S62A~S62n]. The UE periodically or non-periodically checks the UE's buffer status [S63]. In other words, the UE checks an amount of uplink data to be transmitted to the base station (BS). In this case, the UE can check an amount of transmission standby-status data stored in each buffer of a logical channel, an RLC entity, a PDCP entity or an upper layer entity. Alternatively, the UE can check an amount of transmission standby-status data stored in all buffers of logical channels, RLC entities, PDCP entities and upper layer entities which are existed in the UE.

If the above buffer status satisfies a predetermined condition according to the check result of the buffer status, the buffer status information is configured, such that the UE transmits the buffer status information to the base station (BS) [S64]. For example, if at least one buffer contained in the UE does not include uplink data of a transmission standby mode, the UE transmits buffer status information indicating that no data to be transmitted exists to the base station (BS). For another example, under the condition that uplink data stored in at least one buffer of the UE is equal to or less than a predetermined threshold value, the UE transmits buffer status information indicating the above condition to the base station (BS). The above-mentioned threshold value may be set to a predetermined value at which the talk spurt is changed to the silent period during the voice communication process.

Figure 7:
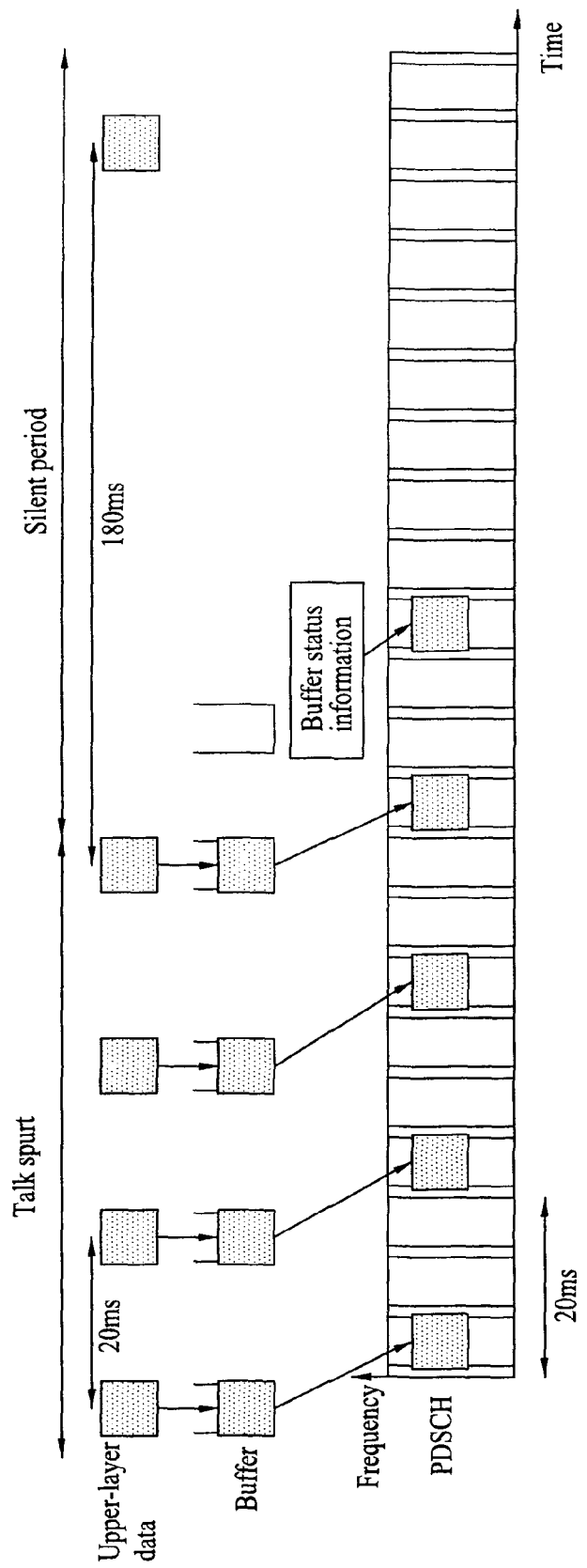
FIG. 7 is a conceptual diagram illustrating a method for allowing a UE to transmit buffer status information from a talk spurt to a Node-B according to the present invention.

FIG. 7 is a conceptual diagram illustrating a method for allowing a UE to transmit buffer status information to a Node-B according to an embodiment of the present invention.

Referring to FIG. 7, during the talk spurt, the UE receives channel resources (i.e., PDSCH) from the base station (BS) via the UL scheduling information, and transmits uplink data, which has been generated at intervals of 20 ms during a voice communication process, to the base station (BS) over the PDSCH. During the talk spurt, data received from an upper layer (e.g., a PDCP or RLC layer) is stored in a buffer of a lower layer (e.g., RLC or MAC layer), such that data continuously exists in the lower-layer buffer. The UE checks a buffer status at any time. For example, if the UE recognizes that there is no data the lower-layer buffer, it configures the buffer status information and transmits the configured buffer status information to the base station (BS). In this case, the UE may transmit the above-mentioned buffer status information to the base station (BS) using the pre-allocated channel resources. For example, the UE configures a MAC Protocol Data Unit (PDU) suitable for the size of channel resources, which have been allocated via the UL scheduling information at intervals of 20 ms, and then transmits the buffer status information to the base station (BS) via the configured MAC PDU. The MAC PDU includes a MAC header and a data part. The buffer status information may be transmitted via the MAC header or the data part. For example, the UE sets a specific field or a specific bit of the MAC header to a predetermined value, such that it can inform the base station (BS) of no Tx data stored in its own buffer using the above set value; The data part is full of padding bits by the UE, so that the UE generates the MAC PDU and transmits the generated MAC PDU to the base station (BS). Otherwise, the UE does not include additional information in the MAC header, and controls the data part to be full of only padding bits, such that it can transmit the resultant MAC header and the resultant data part to the base station (BS). As a result, if the data part is full of only the padding bits, the base station (BS) can recognize that no more Tx data exists in the UE's buffer. For another example, the UE includes the above buffer status information in the data part of the MAC PDU, so that it may transmit the resultant information to the base station (BS). For still another example, provided that the UE has available uplink-allocated radio resources and has no data to be transmitted to its own buffer at a specific time at which the above radio resources can be used, the UE configures the buffer status information and transmits the configured buffer status information. In this case, the buffer status information may include specific information indicating that the UE has no data to be transmitted.

Referring back to FIG. 6, the base station (BS), having received the buffer status information from the UE, transmits acknowledgement (ACK) information of the buffer status information to the UE [S65]. Upon receiving the ACK information from the base station (BS), the UE transmits the SID packet to the base station (BS) using the silent-period's UL scheduling information contained in the scheduling information having received at the radio bearer setup step S61 [S66a~S66n]. In this case, the transmission (Tx) period of the SID packet is 180 ms. Other scheduling information (e.g., uplink channel resources for transmitting the SID packet) other than the above Tx period of the SID packet may be equal to or different from UL scheduling information for transmitting uplink data during the talk spurt.

For another example, if the base station (BS) receives the buffer status information from the UE, the base station (BS) may transmit additional UL scheduling information to be used for SID transmission over the PDCCH during the silent period. In this case, the UE performs PDCCH monitoring after transmitting the buffer status information, and receives UL scheduling information transferred to the UE itself, such that it can transmit the SID packet formed by the silent period to the base station (BS) using the UL scheduling information.

The UE may periodically or non-periodically check its own buffer status during the silent period [S67]. In this case, the UEs may individually check statuses of buffers contained in the protocol layers, or may check all the status information of all buffers contained in all protocol layers.

If the buffer status has satisfied a predetermined condition according to the above buffer status check result, the UE configures buffer status information and transmits the configured buffer status information to the base station (BS) [S68]. For example, if an amount of data stored in at least one buffer from among several buffers of the UE is larger than a predetermined reference value, the UE configures the above buffer status information and transmits the configured buffer status information to the base station (BS). Preferably, the reference value may be equal to the amount of data capable of being transmitted via channel resources, which have been allocated to transmit the SID packet to the base station (BS) during the silent period, however, it should be noted that the scope of the reference value is not limited to only the above-mentioned example and can also be applied to other examples as necessary. In the above-mentioned process, under the condition that the base station (BS) does not inform the UE of the reference-value setup information, if an amount of data capable of being transmitted via the radio resources allocated by the persistent scheduling scheme is larger than that of Tx data stored in an actual buffer, the UE configures the buffer status information and transmits the configured buffer status information to the base station (BS). In this case, the above-mentioned situation that the amount of data stored in the UE's buffer is larger than the reference value indicates that a current status is changed from the silent period to the talk spurt. The above-mentioned buffer status information may include specific information indicating that the amount of data stored in at least one buffer is larger than the reference value, or may include other information indicating the amount of data stored in the UE's buffer.

Figure 8B:
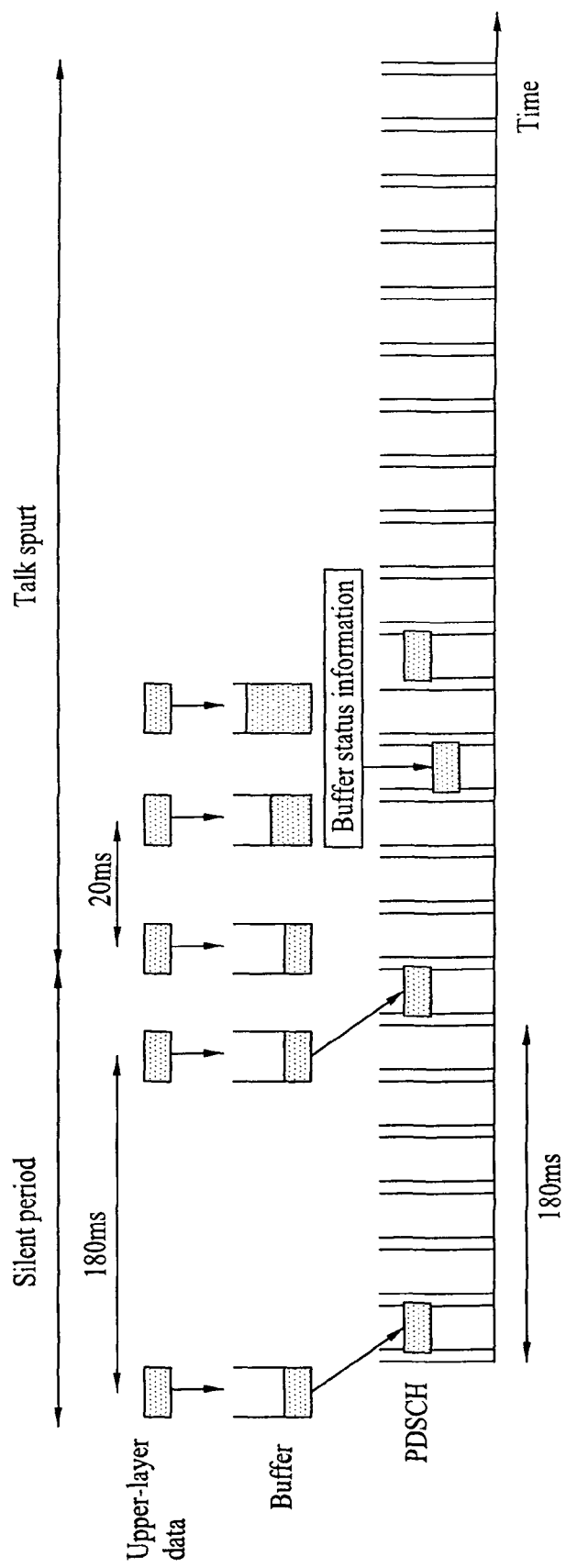

FIGS. 8A and 8B are conceptual diagrams illustrating a method for allowing a UE to transmit buffer status information from a silent period to a Node-B according to an embodiment of the present invention.

Referring to FIG. 8A, the UE transmits the buffer status information to the base station (BS) using the pre-allocated channel resources for transmitting the SID packet during the silent period. In this case, the UE includes the above buffer status information in the SID packet to be transmitted to the base station (BS), and then transmits the resultant SID packet including the buffer status information to the base station (BS).

In FIG. 8B, the UE does not use channel resources which have been allocated for transmitting the SID packet in the silent period, and transmits the buffer status information to the base station (BS) using an additional method. For example, the UE includes the buffer status information in a dedicated scheduling request channel, and transmits the resultant buffer status information to the base station (BS). In this case, the above-mentioned buffer status information may be configured by a method for setting a specific field or bit of the dedicated scheduling request channel according to a predetermined format, so that the resultant buffer status information is contained in the dedicated scheduling request channel. In another embodiment, the UE performs a random access process, includes buffer status information in a specific message transmitted to the base station (BS), and then transmits the resultant buffer status information to the base station (BS).

Referring back to FIG. 6, the base station (BS), having received the buffer status information from the UE, transmits ACK information of the buffer status information to the UE [S69]. Upon receiving the ACK information from the base station (BS), the UE transmits uplink data to the base station (BS) using the talk-spurt's UL scheduling information contained in the scheduling information having received at the radio bearer (RB) setup step S61 [S70a~S70n]. In this case, the transmission (Tx) period of the talk spurt is 20 ms.

For another example, if the base station (BS) receives the buffer status information from the UE, the base station (BS) may transmit additional UL scheduling information to be used for uplink-data transmission over the PDCCH during the talk spurt. In this case, the UE performs PDCCH monitoring after transmitting the buffer status information, and receives UL scheduling information transferred to the UE itself, such that it can transmit the uplink data formed by the talk spurt to the base station (BS) using the UL scheduling information.

The above-mentioned embodiments have been proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The following embodiments of the present invention will be disclosed on the basis of a data communication relationship between the Node-B and the user equipment (UE). In this case, the Node-B is used as a terminal node of a network via which the Node-B can directly communicate with the user equipment (UE).

Specific operations to be conducted by the Node-B in the present invention may also be conducted by an upper node of the Node-B as necessary. In other words, it will be obvious to those skilled in the art that various operations for enabling the Node-B to communicate with the user equipment (UE) in a network composed of several network nodes including the Node-B will be conducted by the Node-B or other network nodes other than the Node-B. The term "Node-B" may be replaced with a fixed station, eNode-B' (eNB), or an access point as necessary. The user equipment (UE) may also be replaced with a mobile station (MS) or a mobile subscriber station (MSS) as necessary.

The above-mentioned embodiments of the present invention can be implemented by hardware, firmware, software, or a combination of them. In the case of implementing the present invention by hardware, the present invention can be implemented with ASICs (application specific integrated circuit), DSPs (digital signal processors), DSPDs (digital signal processing devices), PLDs (programmable logic devices), FPGAs (field programmable gate arrays), a processor, a controller, a microcontroller, and a microprocessor, etc.

If operations or functions of the present invention are implemented by firmware or software, the present invention can be implemented in the form of a variety of formats, for example, modules, procedures, and functions, etc. The software codes may be stored in a memory unit so that it can be driven by a process. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied to wireless communication systems, for example, a mobile communication system and a wireless Internet system.

The invention claimed is:

1. A method for transmitting data from a user equipment (UE) of a wireless communication system to a network, comprising:
    receiving uplink scheduling information from the network, periodically transmitting uplink data to the network according to a first period in talking;
    transmitting buffer status information to the network, if a buffer status of the user equipment (UE) satisfies a predetermined condition, wherein the buffer status information includes specific information indicating amount of data stored in at least one buffer is larger than a reference value, wherein current status is changed from a silent period to a talk spurt at the reference value; and
    periodically transmitting uplink data to the network according to a second period different from the first period in silent,
    wherein the predetermined condition is satisfied when the buffer of the user equipment (UE) has no data to be transmitted.

2. The method of claim 1, wherein the uplink data transmitted according to the second period is transmitted according to uplink scheduling information.

3. The method of claim 1, wherein the buffer of the user equipment (UE) includes at least one buffer contained in protocol entities of the user equipment (UE).

4. The method of claim 1, wherein the uplink data transmitted according to the second period is a silence insertion descriptor (SID) packet formed by a voice communication.

5. The method of claim 1, wherein the second period is longer than the first period.

6. The method of claim 1, wherein the uplink data transmitted according to the second period is transmitted according to uplink scheduling information allocated from the network, after the buffer status information has been transmitted.

7. The method of claim 1, wherein the buffer status information is transmitted via channel resources allocated by the uplink scheduling information.

8. The method of claim 1, wherein the predetermined condition is satisfied when an amount of data stored in the buffer of the user equipment (UE) is larger than a reference value.

9. The method of claim 8, wherein the reference value is an amount of data capable of being transmitted via channel resources allocated by the uplink scheduling information.

10. The method of claim 8, wherein the second period is shorter than the first period.

11. The method of claim 1, wherein the buffer status information is contained in a dedicated scheduling request channel.

12. The method of claim 1, wherein the buffer status information is contained in a specific message while the UE performs a random access process.

13. A method for transmitting data from a user equipment (UE) of a wireless communication system to a network comprising:

receiving uplink scheduling information from the network, transmitting uplink data to the network according to a first mode;

transmitting buffer status information to the network, if a buffer status of the user equipment (UE) satisfies a predetermined condition, wherein the buffer status information includes specific information indicating amount of data stored in at least one buffer is larger than a reference value, wherein current status is changed from a silent period to a talk spurt at the reference value; and transmitting uplink data to the network according to a second mode, wherein the predetermined condition is satisfied when the buffer of the user equipment (UE) has no data to be transmitted.

* * * * *